US008078509B2

(12) United States Patent
Ye et al.

(10) Patent No.: US 8,078,509 B2
(45) Date of Patent: Dec. 13, 2011

(54) METHOD AND SYSTEM FOR AUDITING AND RECONCILING TELECOMMUNICATIONS DATA

(76) Inventors: Cheng Gang Yap Ye, Pahang (MY); Jose Joaquin Arias Ferrer, Zulia (VE); Jose Antonio Alvarado del Campo, Piura (PE); Robert Neps, Glen Ellyn, IL (US)

( * ) Notice: Subject to any disclaimer, the term of this patent is extended or adjusted under 35 U.S.C. 154(b) by 129 days.

(21) Appl. No.: 11/893,025

(22) Filed: Aug. 14, 2007

(65) Prior Publication Data
US 2008/0043951 A1 Feb. 21, 2008

Related U.S. Application Data

(60) Provisional application No. 60/838,261, filed on Aug. 17, 2006.

(51) Int. Cl.
*G06F 15/02* (2006.01)
*G07C 1/10* (2006.01)
*G07F 19/00* (2006.01)
*H04M 15/00* (2006.01)

(52) U.S. Cl. .......................................... 705/32; 705/34
(58) Field of Classification Search ................ 705/32, 705/34
See application file for complete search history.

(56) References Cited

U.S. PATENT DOCUMENTS

| 5,335,278 | A | * | 8/1994 | Matchett et al. ............. 380/248 |
| 5,732,127 | A | * | 3/1998 | Hayes ...................... 379/114.28 |
| 5,802,156 | A | * | 9/1998 | Felger ...................... 379/114.14 |
| 5,933,480 | A | * | 8/1999 | Felger ...................... 379/114.14 |
| 5,966,649 | A | * | 10/1999 | Gulliford et al. ............. 455/408 |
| 5,974,309 | A | * | 10/1999 | Foti ............................ 455/412.1 |
| 5,978,669 | A | * | 11/1999 | Sanmugam .................... 455/410 |
| 5,991,377 | A | * | 11/1999 | Malik ...................... 379/114.05 |
| 5,995,831 | A | * | 11/1999 | Gulliford et al. .......... 455/426.1 |
| 6,058,187 | A | * | 5/2000 | Chen ............................ 713/170 |
| 6,064,881 | A | * | 5/2000 | Shea et al. ..................... 455/427 |
| 6,373,935 | B1 | * | 4/2002 | Afsar et al. .................... 379/145 |
| 6,389,402 | B1 | * | 5/2002 | Ginter et al. .................... 705/51 |
| 6,430,276 | B1 | * | 8/2002 | Bouvier et al. .......... 379/121.01 |
| 6,526,390 | B1 | * | 2/2003 | Wang et al. ..................... 705/39 |
| 6,577,858 | B1 | * | 6/2003 | Gell ............................. 455/407 |
| 6,726,092 | B2 | * | 4/2004 | Goldberg et al. ............. 235/375 |
| 6,885,858 | B2 | * | 4/2005 | Eder et al. ..................... 455/406 |
| 7,076,237 | B2 | * | 7/2006 | Dawson et al. ............... 455/405 |
| 7,079,849 | B2 | * | 7/2006 | Hanson ...................... 455/456.1 |
| 7,133,517 | B2 |   | 11/2006 | Pinckney et al. |
| 7,146,635 | B2 | * | 12/2006 | Eggebraaten et al. ............ 726/4 |

(Continued)

OTHER PUBLICATIONS

Managing the network revenue stream by David E. Klepp Telephony: Nov. 29, 1993: 225/22/ABI/Inform Global :p. 32.*

(Continued)

*Primary Examiner* — Matthew Gart
*Assistant Examiner* — Harshad Parikh
(74) *Attorney, Agent, or Firm* — Lesavich High-Tech Law Group, P.C.; Stephen Lesavich (57) ABSTRACT

A system and method for auditing and reconciliation of telecommunications billing data in real-time to prevent fraud. The system and method includes aggregation and maintenance of billing data records, from a service provider billing system database, its network elements and associated databases in one or more countries to a centralized directory system for the purpose of automatic auditing and reconciliation, and the mapping of billing data records between the billing system database and network elements database.

17 Claims, 3 Drawing Sheets

U.S. PATENT DOCUMENTS

| | | |
|---|---|---|
| 7,149,500 B2 | 12/2006 | Halsell |
| 7,260,409 B2 * | 8/2007 | Hanson .................. 455/456.1 |
| 2002/0161723 A1 * | 10/2002 | Asokan et al. ............... 705/67 |
| 2003/0050044 A1 * | 3/2003 | Awada et al. ............... 455/407 |
| 2003/0050100 A1 * | 3/2003 | Dent ........................ 455/562 |
| 2003/0063734 A1 | 4/2003 | Pickney et al. |
| 2003/0074286 A1 * | 4/2003 | Rodrigo ..................... 705/32 |
| 2004/0148257 A1 * | 7/2004 | Garcia ....................... 705/40 |
| 2004/0153382 A1 * | 8/2004 | Boccuzzi et al. ............. 705/34 |
| 2004/0186798 A1 * | 9/2004 | Blitch et al. ................ 705/29 |
| 2004/0193516 A1 * | 9/2004 | Fine et al. .................. 705/32 |
| 2004/0203750 A1 * | 10/2004 | Cowdrey et al. .......... 455/432.1 |
| 2004/0267646 A1 * | 12/2004 | Chandhok et al. ............ 705/34 |
| 2005/0031103 A1 * | 2/2005 | Gunderman ............ 379/114.03 |
| 2005/0044018 A1 * | 2/2005 | Whewell ..................... 705/34 |
| 2005/0107066 A1 * | 5/2005 | Erskine et al. ............... 455/405 |
| 2005/0113064 A1 | 5/2005 | Halsell et al. |
| 2005/0182701 A1 * | 8/2005 | Cheston et al. ............... 705/32 |
| 2005/0192877 A1 * | 9/2005 | Smith et al. ................. 705/34 |
| 2005/0216382 A1 * | 9/2005 | Chambers et al. ............ 705/34 |
| 2005/0262020 A1 * | 11/2005 | Karlsson .................... 705/41 |
| 2006/0020525 A1 * | 1/2006 | Borelli et al. ................ 705/34 |
| 2006/0047540 A1 * | 3/2006 | Hutten et al. ................. 705/4 |
| 2006/0112021 A1 * | 5/2006 | Maki ......................... 705/67 |
| 2006/0116105 A1 * | 6/2006 | Frankel et al. .............. 455/406 |
| 2006/0116892 A1 * | 6/2006 | Grimes et al. ................ 705/1 |
| 2006/0224402 A1 * | 10/2006 | Hanna et al. ................. 705/1 |
| 2006/0293935 A1 * | 12/2006 | Tsyganskiy et al. .......... 705/7 |
| 2007/0202868 A1 * | 8/2007 | Adams et al. ............... 455/424 |
| 2007/0274498 A1 | 11/2007 | Natter et al. |
| 2007/0293200 A1 * | 12/2007 | Roundtree et al. ......... 455/414.1 |

OTHER PUBLICATIONS

Veramark Unveils VeraSMART; Business wire, Jun. 11, 2003.*
Managing Technology No Noundaries, by Karen D. Schwartz, Government Executive, Aug. 1, 2003.*
Resource-based interdependencies in value networks for mobile e-services, International Journal of E-Business Research, vol. 1, No. 3, p. 1, Jul. 2005.*
The fraud vanguard, Donna Rogers, Corrective Forum, Hicksville, Jan./Feb. 2002, vol. 11, Issue 1 pp. 17 (6 pages).*
Rules and evasion by David Loshin, New York, Feb. 2004 vol. 14, Issue 2, p. 62.*

* cited by examiner

METHOD AND SYSTEM FOR AUDITING AND RECONCILING TELECOMMUNICATIONS DATA

CROSS REFERENCES TO RELATED APPLICATIONS

This application claims priority to U.S. Provisional Patent Application No. 60/838,261, filed on Aug. 17, 2006, the contents of which are incorporated by reference.

FIELD OF INVENTION

This application relates to automatic processing of telecommunications information. More specifically, it relates to a method and system for auditing and reconciling telecommunications data.

BACKGROUND OF THE INVENTION

There are many mobile and non-mobile devices such mobile phone, non-mobile phone, non-mobile computers, wireless devices, laptop computers, personal information devices, personal digital/data assistants (PDA), hand-held devices, network appliances, Internet appliances, two-way pagers, etc. that are used on telecommunications networks.

The users of such mobile and non-mobile devices typically pay a service provider for some type of subscription service such as voice, video and/or data services as a subscriber. It is important to the service provider to properly track usage and the subscriber for any services and/or feature a subscriber may use and receive the appropriate revenue for such subscription services.

In many instance, mobile devices are used far away a home area and may be used in another country. If the mobile device is used in another country, the mobile device may connect with a foreign service provider and the foreign service provider will then send a bill such use to the home service provider. For example, a user may travel from the United States to Mexico and connect to a Mexican telephone service. The Mexican telephone service will then bill the corresponding service provider in the United States for use of the telecommunication services and the telecommunications network in Mexico.

A similar situation applies to non-mobile devices when long distance calls or connections are made outside a home area. The long distance connections may be in a different state, the same state, the same country, another country, etc. It a non-home service provider will then bill the home service provider for such services.

In many instances, unintentional and/or intentional mistakes are made in the billing process. A home service provider, any intermediate service providers and ultimately the user of the services may be overcharged or undercharged for the services used.

In other instances users of mobile devices often try multiple ways to fraudulently obtain free services that non-fraudulent users pay a subscription fee for. For example, a fraudulent user may visit a web-site that provides stolen, real or fake credit card numbers or real or fake telephone access card numbers and the numbers with payment of any fees. It is desirable to prevent such fraud.

Thus, there exists a need to automatically audit and reconcile billing data among telecommunications service providers and/or users in one or more countries in real-time to help prevent such fraud.

SUMMARY OF THE INVENTION

In accordance with preferred embodiments of the invention, some of the problems associated with auditing and reconciling telecommunications billing are overcome.

A system and method for auditing and reconciliation of telecommunications billing data in real-time to prevent fraud. The system and method includes aggregation and maintenance of billing data records, from a service provider billing system database, its network elements and associated databases in one or more countries, to a centralized directory system for the purpose of automatic auditing and reconciliation, and the mapping of billing data records between the billing system database and network elements database.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Exemplery Billing Processing System

Figure 1:
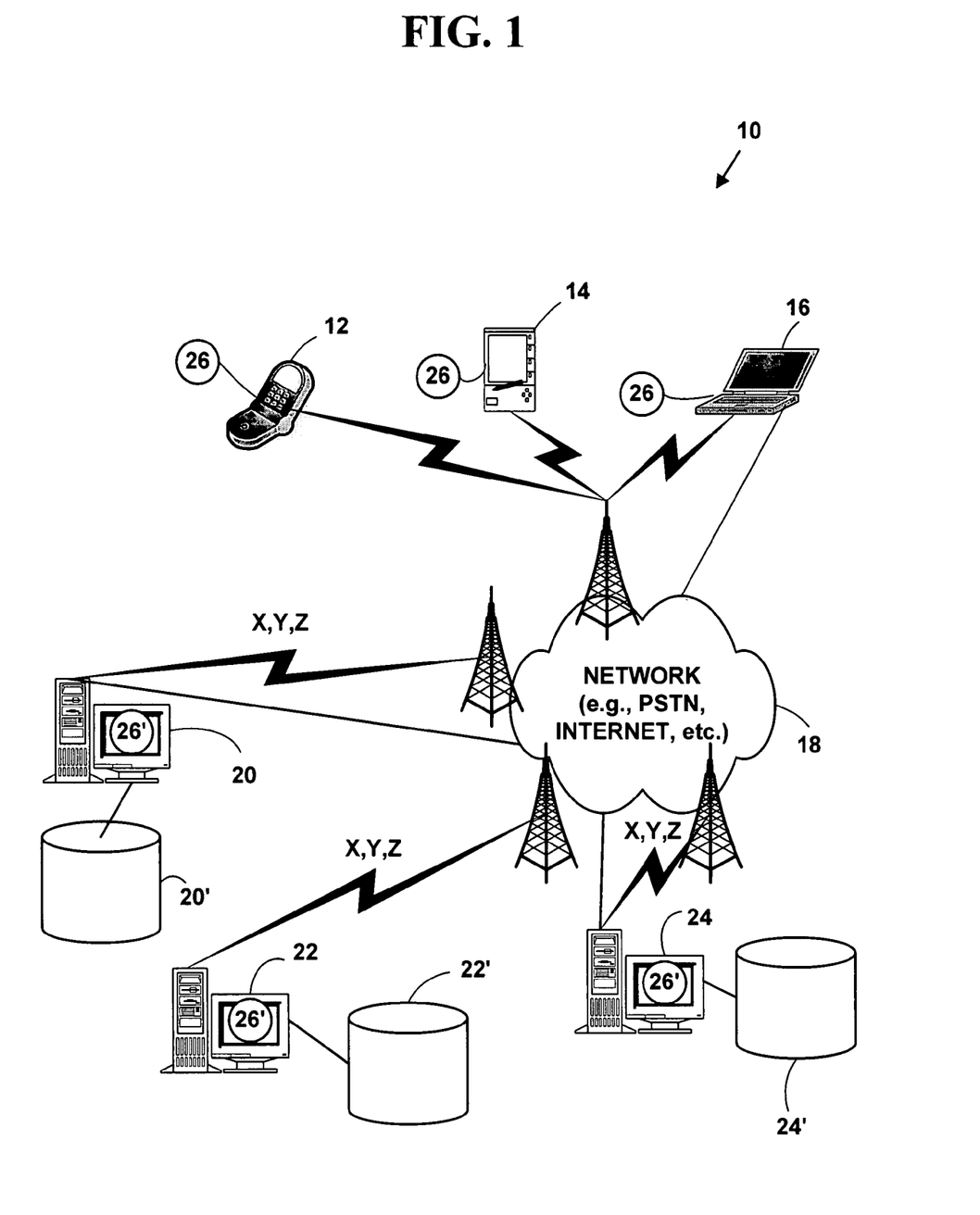
FIG. 1 is a block diagram illustrating an exemplary electronic information processing system.

FIG. 1 is a block diagram illustrating an exemplary communications and billing system 10. The exemplary system 10 includes, but is not limited to, one or more mobile network devices 12, 14, 16 (only three of which are illustrated). The mobile target network devices 12, 14, 16 include, but are not limited to, mobile phone, non-mobile phone, non-mobile computers, wireless devices, laptop computers, personal information devices, personal digital/data assistants (PDA), hand-held devices, network appliances, Internet appliances, two-way pagers, etc. The target devices can also be non-mobile but are referred to hereinafter as mobile target network device 12, 14, 16. However, the present invention is not limited to these mobile target electronic devices and more, fewer or others types of target electronic devices can also be used. The mobile target network devices 12, 14, 16 function as client devices in some instances and server devices in other instances.

The mobile network devices 12, 14, 16 are in communications with a communications network 18. The communications network 18 includes, but is not limited to, the Internet, an intranet, a wired Local Area Network (LAN), a wireless LAN (WiLAN), a Wide Area Network (WAN), a Metropolitan Area Network (MAN), wired and wireless Public Switched Telephone Network (PSTN), satellite and other types of wired and wireless communications networks 18 providing voice, video and data communications with wired or wireless communication protocols.

Plural network devices 20, 22, 24 (only three of which are illustrated) include one or more associated databases 20', 22', 24'. The plural network devices 20, 22, 24 are in communications with the one or more target network devices 12, 14, 16 via the communications network 18. The plural network devices 20, 22, 24, include, but are not limited to, wireless or wired communications servers.

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

In one embodiment, the target network devices 12, 14, 16 and the source network devices 20, 22, 24 include a billing application 26 with plural software modules. The multiple software modules may be implemented in firmware, hardware or any combination thereof. In one embodiment, the target network devices 12, 14, 16 may include a plug-in 28 for a browser with plural software modules.

The communications network 18 may also include one or more servers or access points (AP) including wired and wireless access points (WiaP) (e.g., 20).

The communications network 18 includes data networks using the Transmission Control Protocol (TCP), User Datagram Protocol (UDP), Internet Protocol (IP) and other data protocols.

The communications network 18 may also include wired interfaces connecting portions of a PSTN or cable television network that connect the network devices 12, 14, 16 via one or more twisted pairs of copper wires, coaxial cable, fiber optic cable, other connection media or other connection interfaces. The PSTN is any public switched telephone network provided by AT&T, GTE, Sprint, MCI, SBC, Verizon and others in the United States and countries other than the United States.

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, the ADSL Forum or the Federal Communications Commission (FCC). However, network devices based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com." FCC E911 can be found at the URL "www.fcc.gov/911/enhanced."

An operating environment for network devices and interfaces of the present invention include a processing system with one or more high speed Central Processing Unit(s) ("CPU") or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection ("OSI") reference model is a layered architecture that standardizes levels of service and types of interaction for network devices exchanging information through a communications network. The OSI reference model separates network device-to-network device communications into seven protocol layers, or levels, each building-and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

In one embodiment of the present invention, the wireless interfaces used for the plural target network devices 12, 14, 16 include but are not limited to, a paging and wireless messaging network, a cellular telephone network, a Packet Cellular Network ("PCN") or Global System for Mobile Communications, ("GSM"), Generic Packet Radio Services ("GPRS"), or network/Personal Communications Services network ("PCS"), a Cellular Digital Packet Data ("CDPD"), Wireless Application Protocol ("WAP") or Digital Audio Broadcasting ("DAB") network or other types of wireless networks.

The wireless networks include, but are not limited to Code Division Multiple Access ("CDMA"), Time Division Multiple Access ("TDMA"), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is currently not widely used in the United States, but its use is growing. GSM is a wireless platform based on TDMA to digitize data. GSM includes not only telephony and Short Message Services ("SMS") but also voice mail, call forwarding, fax, caller ID, Internet access, and e-mail. As is known in the art, SMS is type of communications service that enables a user to allow private message communications with another user.

GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network ("PCN") includes various types of packetized cellular data.

In one embodiment of the present invention, the wireless interfaces used for the plural target network devices 12, 14, 16 include but are not limited to, an IEEE 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN), "RF Home" or other wireless interfaces.

As is known in the art, 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

The target devices 12, 14, 16 include a protocol stack with multiple layers based on the Internet Protocol or OSI reference model. The protocol stack includes, but is not limited to, TCP, UDP, IP, Hypertext Transfer Protocol (HTTP), Simple Mail Transfer Protocol (SMTP), Post Office Protocol version 3 (POP3), Internet Mail Access Protocol (IMAP), Voice-Over-IP (VoIP), Instant-Messaging (IM) Short Message Services (SMS) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference. An IP address includes four sets of numbers divided by period (e.g., x.x.x.x) in the range of zero to 255. An IP address is a unique string of numbers that identifies a device on an IP based network.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

EXtensible Markup Language (XML) is XML (Extensible Markup Language) is a markup language for data that allows information and services to be encoded with meaningful structure and semantics that computers and humans can understand. XML is used for information exchange, and includes user-specified and industry-specified tags. For more information on XML, see IETF RFC 3023.

Media Access Control (MAC) is a data link layer protocol. A MAC address is a physical address of a device connected to a communications network, expressed as a 48-bit hexadecimal number. A MAC address is permanently assigned to each unit of most types of networking hardware, such as network interface cards (NICs), by manufacturers at the factory.

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, H.323, H.324, DNS, AAA, etc.) that convert a voice signal into a stream of packets (e.g., IP 28 packets) on a packet network and back again. VoIP allows voice signals to travel over a stream of data packets over a communications network 18.

As is known in the art, Session Initiation Protocol (SIP) supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, Service Location Protocol (SLP) provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of main family of video conferencing recommendations for IP networks. The ITU-T H.323 standards entitled "Packet-based multimedia communications systems" dated 02/98, 09/99, 11/00 and 07/03 are incorporated herein by reference.

As is known in the art, H.324 is a video conferencing recommendation using Plain Old Telephone Service (POTS) lines. The ITU-T H.324 standards entitled "Terminal for low bit-rate multimedia communication" dated 02/98 and 03/02 are incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Lightweight Directory Access Protocol (LDAP) is a software protocol for enabling anyone to locate organizations, individuals, and other resources such as files and devices in a network, whether on the public Internet or on private intranet or other communications network 18. LDAP is a "lightweight" version of Directory Access Protocol (DAP), which is part of X.500, a standard for directory services in a network.

Security and Encryption

Devices and interfaces of the present invention may include security and encryption for secure communications. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length<$2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

LDAP may be used with X.509 security. As is known in the art, X.509 is public key digital certificate standard developed as part of the X.500 directory specification. X.509 is used for secure management and distribution of digitally signed certificates across networks.

Billing Auditing and Reconciliation

Figure 2:
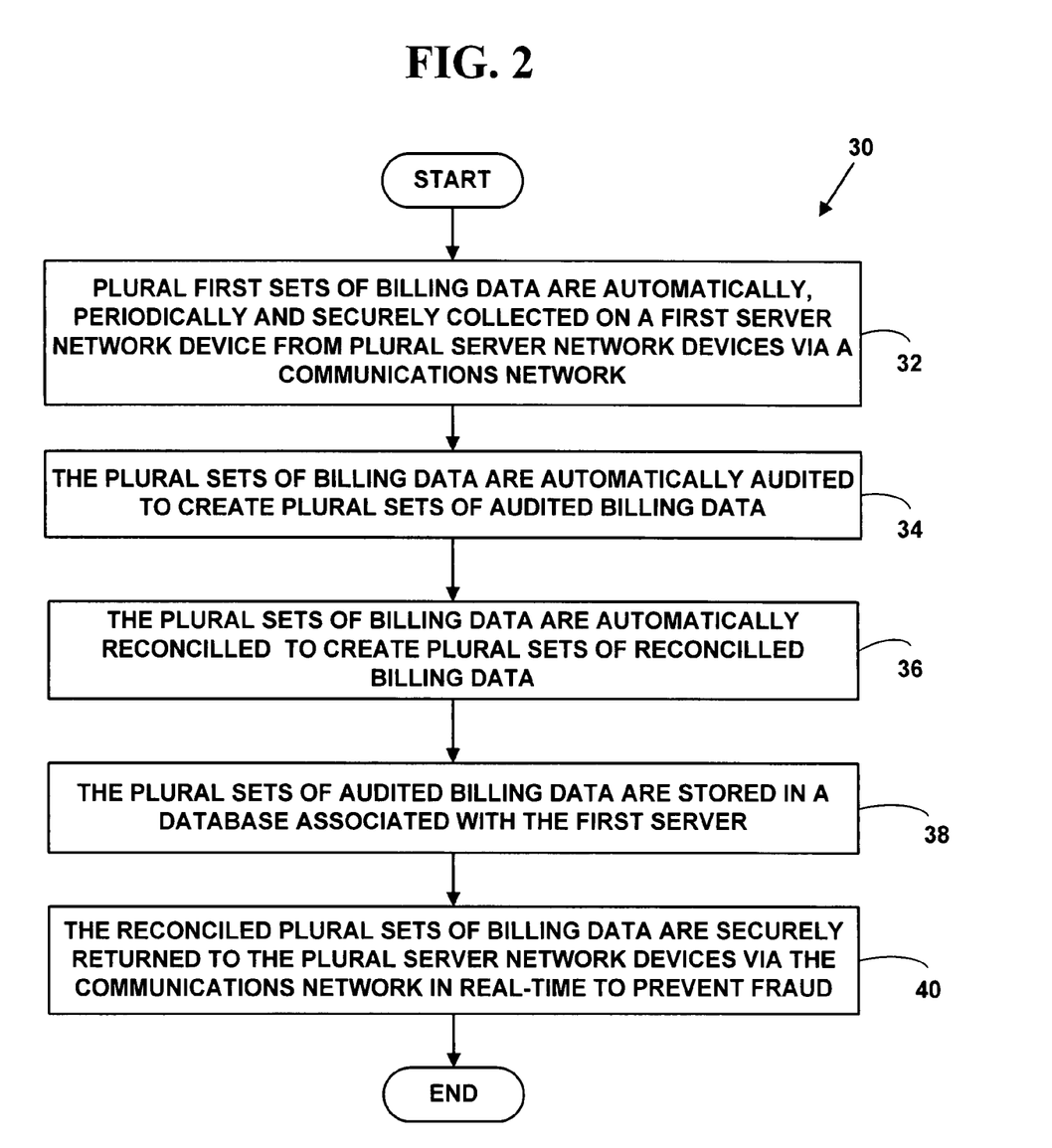
FIG. 2 is a flow diagram illustrating a method for billing auditing and reconciliation.

FIG. 2 is a flow diagram illustrating a Method 30 for billing auditing and reconciliation. At Step 32, plural first sets of billing data are automatically, periodically and securely collected on a first server network device from plural server network devices via a communications network. The plural first sets of billing data are each collected for plural mobile target network devices for use of subscription services on the communications network. At Step 34, the plural sets of billing data are automatically audited to create plural sets of audited billing data. At Step 36, the plural sets of billing data are automatically reconciled to create plural sets of reconciled billing data. At Step 38, the plural sets of reconciled billing data are automatically stored in a database associated with the first server. At Step 40, the plural sets of reconciled billing data are automatically securely returned to the plural server network devices via the communications network. The audited plural sets of billing data are used to in real-time to prevent fraudulent use of subscription services on the communications network create and to create bills for the plural mobile target network devices for use of the subscription services on the communications network.

Method 30 is illustrated with one exemplary embodiment. However, the present invention is not limited to such an embodiment and other embodiments can also be used to practice the invention.

In such an exemplary embodiment at Step 32, plural sets of billing data are automatically, periodically and securely collected on a first server network device 20 from plural server network devices 22, 24 via a communications network 18. The plural first sets of billing data are each collected for plural client network devices 12, 14, 16 for use of services on the communications network 18.

In one embodiment, the subscription services on the communications network 18 include, but are not limited to, voice and data services. The data services, include, but are not limited to voice, video, audio, electronic mail, text messaging services or short messaging services. In one specific embodiment, the voice data services include Voice over Internet Protocol (VoIP).

In one embodiment, the system 10 aggregates subscriber information as plural data sets from a voice and/or data operator or providers diverse network elements such as servers 22, 24, switches, routers, bridges, other databases 22', 24', wired and wireless access points, etc. The network elements may all be in one country (e.g., U.S.) or in multiple different countries (e.g., U.S. Mexico, Canada, etc.).

At Step 34, the plural first sets of billing data are automatically audited to create plural sets of audited billing data. In one embodiment, the automatic auditing and includes those activities illustrated in Table 1. However, the present invention is not limited to such an embodiment and other embodiments can also be used to practice the invention.

TABLE 1

1) Flexible Auditing Options

The auditing process can be initiated for different purposes. The auditing process can audit subscriber information at a subscription level, which is useful to check for the existence or non-existence of a subscriber. It can also audit subscriber information at a service level, which is more detailed, and is useful to check for the consistency of services of a subscriber. Auditing also includes a real-time, or mass auditing process. Alternatively, the auditing process can be scheduled to regularly audit subscriber information when network traffic is smaller (e.g., during late evening or early morning hours. The auditing process is capable of auditing complex services (e.g., 1 to n mapping, etc.).

2) Real-time Fraud Detection (Through CDR Analysis)

Real-time Call Detail Record (CDR) analysis enables an operator to detect fraud as it is occurring. This allows a Network Element Auditor (NEA) to identify inconsistencies, and a Network Element Reconciliation (NER) to reconcile the network elements in real-time.

3) Non-intrusive Auditing Process

Subscriber data is stored in a LDAP directory. By using data in the directory, the auditing process minimizes impact on the network elements 22, 24 and the system 10.

The auditing process allows at least the following capabilities: real-time audit of a single subscriber, real-time audit and batch audit of a group of subscribers, real-time audit and batch audit of all subscribers. The auditing process uses the configurable expressions that describe the mapping of relationship between data records in the billing system database and the network elements database as part of its decision making process. In another embodiment, audits are done in a non-real-time mode, including batch and non-batch operations.

The auditing process output illustrates the subscriber as consistent or inconsistent. In the case of inconsistency, the auditing process also produces the inconsistent data summary (identification, services, attributes, etc.). Inconsistent audit data is typically an indicator that a fraud is occurring. However, inconsistent audit data can also be an indication of mistakes occurring with the data associated with a subscriber of a target mobile network device (e.g., wrong spelling of name, wrong address, new address because of a recent move, more or fewer subscription services, etc.).

In one embodiment, the auditing process uses configurable expressions that describe a mapping of relationships between data records in the system 10 database 20' and the network elements 22, 24 database 22', 24' as part of its decision making process. The auditing process output shows the subscriber as consistent or inconsistent. In the case of inconsistency, the auditing process also produces the inconsistent data (identification, services, attributes, etc.).

At Step 36, the plural sets of billing data are automatically reconciled to create plural sets of reconciled billing data. In one embodiment, reconciliation includes processing of inconsistent audit data. Inconsistencies are addressed and resolved through reconciliation of the network element 22, 24 data. The reconciliation system can fix inconsistencies on the network elements 22, 24 directly. This is usually done through a provisioning interface of the network element (more commonly known as the MML interface).

At Step 38, the audited plural sets of reconciled billing data are automatically stored in a database 20' associated with the first server 20.

In one embodiment, the database 20' generally comprises subscriber and telephony services data records. The system and method aggregates data from the database 20' to a central Directory (e.g., LDAP directory). The data in the Directory is an abstraction of the data records from the billing system database 20' and network elements databases 22' 24'. The system and method allows the capability to perform various auditing and reconciliation functions, in batch or real-time, on part or whole of the data in the Directory.

In one embodiment, the system 10 and stores the plural data sets in an LDAP directory. This model enables usage of the aggregated data without impacting the performance of the network elements 22, 22', 24, 24', and system 10. However, the present invention is not limited to such an embodiment and other embodiments can also be used to practice the invention.

In one embodiment, a centralized data model is used. The disparate nature of an operator's network infrastructure and system typically causes difficult accessibility. This limitation is overcome by aggregating subscriber data and storing it at a centralized directory service (e.g., LDAP). This allows operators to easily and quickly access subscriber data of the disparate systems. This model also enables usage of the aggregated data without impacting the performance of the network elements 22, 24, and system 10. Locating subscriber data at a centralized directory protocol provides many advantages over a decentralized model, including but not limited to ease of management, and greater control.

At Step 40, the plural sets of reconciled billing data are automatically securely returned to the plural server network devices 22, 24 via the communications network 18 in real-time to prevent fraudulent use of subscription services on the communications network. The plural sets of reconciled billing data are also used to create bills for the plural mobile target network devices 12, 14, 16 for use of the subscription services on the communications network 18.

In one exemplary embodiment, the secure collection and secure return include, but are not limited to, securely transferring data using encryption and other secure transport mechanisms described above (e.g., SSL, TLS, etc).

Figure 3:
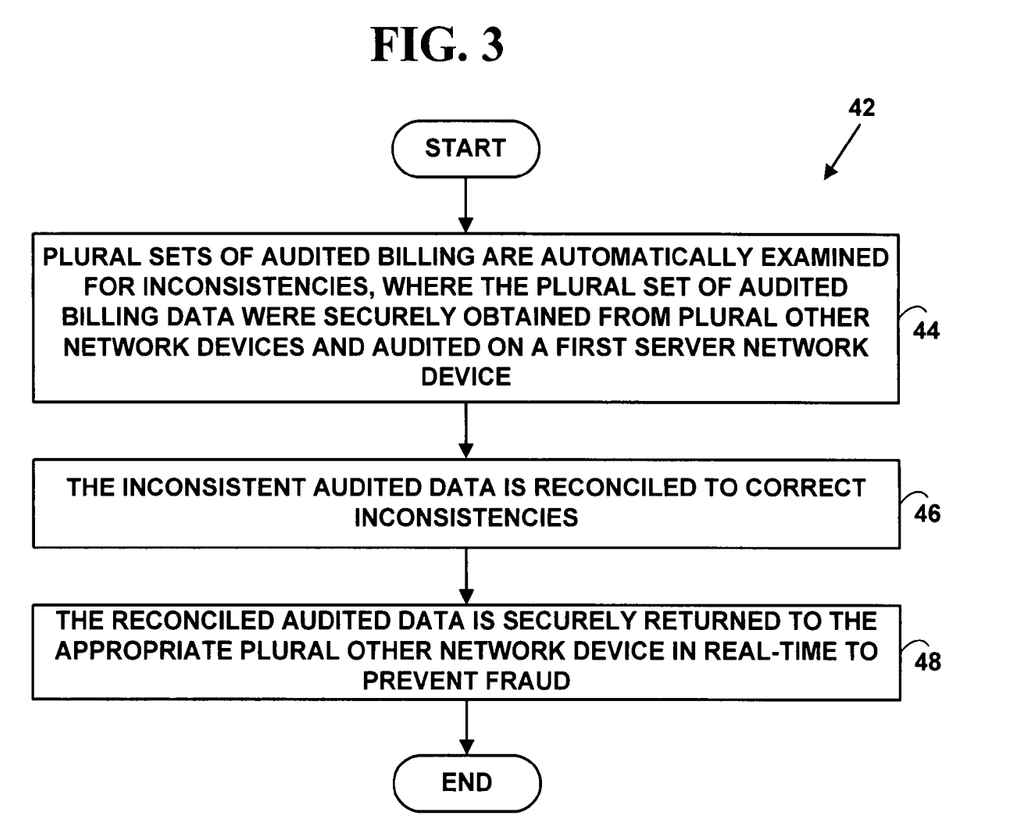
FIG. 3 is a flow diagram illustrating a method for tracking audited and reconciled billing data.

FIG. 3 is a flow diagram illustrating a Method 42 for tracking audited and reconciled billing data. At Step 44, plural sets of audited billing are automatically examined for inconsistencies on a first server network device. The plural set of audited billing data were securely obtained plural from the other network devices via the communications network and audited on the first server network device. At Step 46, the inconsistent audited data is automatically reconciled, if necessary, to correct inconsistencies to created reconciled audit data. At Step 48, the reconciled audited data is automatically securely returned to the plural other network devices via the communications network in real-time to reduce fraudulent use of subscription services by target mobile network devices on the communications network.

Method 42 is illustrated with one exemplary embodiment. However, the present invention is not limited to such an embodiment and other embodiments can also be used to practice the invention.

In such an exemplary embodiment, At Step 44, plural sets of audited billing data stored in a central Directory are automatically examined for inconsistencies on the first server network device 20. The plural set of audited billing data were securely obtained from plural other server network devices 22, 24 via the communications network 18 and audited on the first server network device 20. In one embodiment the automatic examination using LDAP to access the audited billing data.

In one exemplary embodiment, an auditor process creates an extensible Markup Language (XML) message including the inconsistencies. A reconciliation process interprets this message at Step 46 and determines a configuration for a matching inconsistency template for each of the inconsistencies.

At Step 46, the inconsistent audited data is automatically reconciled to correct inconsistencies and create reconciled audit data. In one embodiment, the reconciliation process is invoked automatically by an auditor process.

At Step 48, the reconciled audited data is automatically securely returned to the appropriate plural other server network devices 22, 24 via the communications network 18 in real-time to reduce fraudulent use of subscription services by target mobile network devices 12, 14, 16 on the communications network 18.

In various embodiments the methods and system described herein includes, but is not limited to: (1) High performance auditing capability; (2) Accurate auditing capability; (3) Minimal impact on the billing system and network elements; (4) Availability of subscriber data records; and (4) Configurable expressions to describe the mapping of relationship between data records in the billing system database and the network elements database for auditing and reconciliation purpose.

In one embodiment the methods and system comprises a kernel 26', and adapter(s) as an application 26. The kernel and adapter(s) include hardware, software, firmware or a combination thereof. However, the present invention is not limited to such an embodiment and other embodiments can also be used to practice the invention.

The kernel 26' maintains data records in the Directory on server 20. The adapter(s) is the interface means to the billing system and network elements 22, 24. The kernel 26' communicates with the adapters using message queues.

The kernel 26' is generally concerned with the accuracy of data records in the directory. To achieve this, the following approaches in Table 2 are employed, but not limited to:

TABLE 2

(a) Sweeping
(b) Paging
(c) Propagating
(d) Real-time Triggering

The kernel 26' updates billing data records in the directory by querying the billing system database and the network elements database listed in Table 3 including, but not limited to:

TABLE 3

(a) Sweeping sequentially updates data records in the Directory.
(b) Paging actively queries the billing system 10 for recent changes to the database due to service provisioning.
(c) Propagating propagates from one sub-tree of the directory to other sub-trees (according to configuration) of the Directory.
(d) Real-time triggering is the process whereby real-time operations update data records in the Directory with the most recent data.

All of these approaches help ensure data accuracy in the Directory.

In one embodiment, the reconciliation process sends the list of network element commands in the matching inconsistency template to the adapters using a message queue. The adapters return the execution result to the reconciliation process, and this completes the transaction.

The adapters interface the billing system 10 and the network elements 22, 24. The adapters are concerned, but not limited to, the following tasks illustrated in Table 4:

TABLE 4

(a) Query subscriber data from the billing system or the network elements 22, 24;
(b) Convert database dump from the billing system or the network elements to LDIF formatted data records; and
(c) Execute commands on the network elements 22, 24.

The conversion of database dumps is useful to "bootstrap" the system. Bootstrapping the system populates the Directory with initial data records. The adapters convert database dump, usually in proprietary format, to a standard LDIF formatted data records. The LDIF formatted data records are then loaded into the directory. The load process considers data records that are different and more recent than data records in the directory. The execution of commands on the network elements are used for the purpose of reconciliation.

Data mining can be performed on data records in the Directory for various functions. Directory planning involves the following, but is not limited to those illustrated in Table 5:

TABLE 5

(a) Schema design
(b) Topology design

The schema design includes various wired and wireless technologies (e.g., CDMA, GSM, IDEN, etc.) Generally, the schema design represents telephony subscriber's identification, services, and attributes. The data records in the Directory are therefore an abstraction of data records from the billing system and the network elements. However, it may also contain ancillary data such as subscriber's profile, personal data, etc.

Topology design groups data records from the billing system and each network elements in their own sub-trees in the Directory for the purposes of auditing and reconciliation. Topology design also involves the distribution of subscriber data over multiple Directories. This topology is used to scale the system 10.

The capability to do real-time fraud detection through Call Detail Record (CDR) analysis is the function of an add-on component. This component analyzes CDR as they are generated from a switch in real-time and consults data records in the directory for various fraud cases. It reports fraud cases in an XML record, and can also trigger the reconciliation process if configured to do so.

The real-time fraud detection method consists of a console and Web user interfaces (UI). The method allows the user the following capabilities, but not limited to those illustrated in Table 6:

TABLE 6

(a) Audit a subscriber
(b) Audit a subscriber in real-time
(c) Query multiple subscribers using the RDN
(d) Query for subscribers by attribute
(e) Audit a list of subscribers, or all subscribers through console UI
(f) View history of audit reports
(g) View history of real-time fraud detection reports
(h) Data mining functions The system and method described herein provides auditing and reconciliation of telecommunications billing data in real-time to prevent fraud. The system and method includes aggregation and maintenance of billing data records, from a service provider billing system database, its network elements and associated databases in one or more countries, to a centralized directory system and provides automatic auditing and reconciliation, and the mapping of billing data records between the billing system database and network elements database.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "imeans" is not so intended.

Therefore, all embodiments that come within the scope and spirit of the following claims and equivalents thereto are claimed as the invention.

We claim:

1. A method for collecting, auditing, reconciling and billing on a communications network, comprising:

(A) automatically, securely, collecting, via a communications network, a plurality of first sets of billing data on a billing application with plural software modules included in a first server network device with one or more processors from a plurality of other server network devices, wherein the first server network device and the plurality of other server network devices each have one or more processors, wherein the plurality of first sets of billing data are each collected in real-time for a plurality of mobile target network devices for use of subscription services on the communications network, wherein a time period for a real-time event completed on the billing application is equivalent to an amount of time required to successfully initiate and connect an individual mobile target network device to a subscription service on the communications network and wherein the subscription services include voice, video or data subscription services;

(B) automatically, on the billing application, auditing, the plurality of sets of billing data to create a plurality of sets of audited billing data;

(C) automatically, reconciling, on the billing application, the plurality of sets of audited billing data to create a plurality of sets of reconciled billing data;

(D) automatically, storing, the plurality of audited and reconciled sets of billing data, in a database associated with the billing application on the first server network device;

(E) automatically, securely, returning, the plurality of sets of reconciled billing data from the billing application to the plurality of server network devices via the communications network in real-time, wherein the reconciled plurality of sets of billing data are used to detect and prevent fraudulent use of subscription services on the communications network, wherein fraudulent use of the subscription service includes an attempt to initiate a subscription service that a target mobile network device is not authorized to use or has not paid a required fee to use;

(F) automatically, detecting, fraud, in real-time, on the billing application using the plurality of sets of reconciled billing records, as any attempted fraudulent initiation of any of the subscription services is being requested by any of the plurality of mobile target network devices on the communications network and before the initiation of any of the subscription services is actually completed on the communications network by comparing in real-time on the billing application on the first server network device selected ones of the reconciled billing records for a mobile target network device to a current call record for the mobile target network device and determining whether any inconsistencies exist between selected ones of the reconciled billing records and the current call record as the mobile target network device is attempting to initiate a subscription service on the communications network;

(G) automatically, in real-time, on the billing application, completing an additional reconciliation of the selected ones of the reconciled billing records for the mobile target network device based on the determined inconsistencies between the selected ones of the reconciled billing records and the current call record, thereby creating a set of additional reconciled billing records wherein the set of additional reconciliation billing records includes reconciliation of billing records obtained from a plurality of network elements in one or more other different countries and stored in a centralized database associated with the first server network device;

(H) automatically, comparing, in real-time, on the billing application, on the first server network device the additional set of reconciled billing records to the current call record for the mobile target network device and determining whether any additional inconsistencies exist;

(J) automatically, preventing any attempted fraudulent initiation of any of the subscription services in real-time on the billing application by refusing initiation of any of the subscription services for the mobile target network device on the communications network;

(K) automatically, examining in real-time on the billing application the sets of newly developed, audited, reconciled and stored billing records with records stored in the centralized database associated with the first server network device for inconsistencies;

(L) automatically, re-reconciling, in real-time, on the billing application, any inconsistent examined data in the set of additional reconciled billing records to correct inconsistencies and create a re-examined set of reconciled billing records; and (M) automatically, returning, in real-time, the re-examined set of reconciled billing records to appropriate server network devices in the plurality of other server network devices via the communications network, (N) wherein the re-examined set of reconciled billing records are also used to detect and prevent fraudulent initiation of any subscription services by any target mobile network devices on the communications network in real-time as any mobile target network device is attempting to initiate a subscription service on the communications network and before the initiation of any of the subscription services is actually completed on the communications network.

2. The method of clam 1 wherein the data services include voice, Voice over Internet Protocol (VoIP), video, audio, electronic mail, text messaging services and short message services.

3. The method of claim 1 wherein the automatically auditing step includes a real-time Call Detail Record (CDR) analysis to detect fraud in real-time as it is occurring.

4. The method of claim 1 wherein the automatically auditing step provides real-time audit of a single subscriber, real-time audit of a group of subscribers and real-time audit of all subscribers.

5. The method of claim 1 wherein the automatically auditing step includes a non-intrusive auditing process wherein subscriber data is stored in directory accessible via Lightweight Directory Access Protocol (LDAP).

6. The method of claim 1 wherein the automatically auditing step includes designating subscriber data as consistent audit data or inconsistent audit data.

7. The method of claim 1 wherein automatically reconciling step includes an automatic reconciliation process that includes processing of inconsistent audit data to reconcile any inconsistencies in the audit data.

8. The method of claim 1 wherein the storing step includes storing the plurality of audited plural sets of billing data in a central directory in the database, wherein the central directory is an abstraction of data records from a billing system database stored in the database and a plurality of network elements with associated databases that collect billing data from target mobile network devices.

9. The method of claim 8 wherein the central directory is accessible via Lightweight Directory Access Protocol (LDAP).

10. The method of claim 8 wherein the plurality of network elements include a plurality of servers, switches, routers, bridges, wired access points and wireless access points in one country or in a plurality of countries.

11. The method of claim 8 wherein the abstraction of data in the central directory allows auditing and reconciliation processing without impacting the performance of the plurality of network elements on the communications network.

12. The method of claim 1 wherein the plurality of sets of audited billing data are from a plurality of different countries.

13. The method of claim 1 wherein the automatically examining step includes an automatic non-intrusive auditing process wherein audit data is stored in a central directory in the database accessible via Lightweight Directory Access Protocol (LDAP).

14. The method of claim 1 wherein the automatically examining step includes an automatic auditor process that creates an eXtensible Markup Language (XML) message including any audit inconsistencies obtained from the plurality of sets of audited billing data.

15. The method of claim 1 wherein the automatic reconciling step includes an automatic reconciliation process that interprets an eXtensible Markup Language (XML) message created by an auditor process and determines a configuration for a matching inconsistency template for each audit inconsistency.

16. A non-transitory computer readable medium having stored therein a plurality of instructions for causing one or more processors on a network device to execute the steps comprising:
- (A) automatically, securely, collecting, via a communications network, a plurality of first sets of billing data on a billing application with plural software modules included in a first server network device with one or more processors from a plurality of other server network devices,
  wherein the first server network device and the plurality of other server network devices each have one or more processors,
  wherein the plurality of first sets of billing data are each collected in real-time for a plurality of mobile target network devices for use of subscription services on the communications network,
  wherein a time period for a real-time event completed on the billing application is equivalent to an amount of time required to successfully initiate and connect an individual mobile target network device to a subscription service on the communications network and wherein the subscription services include voice, video or data subscription services;
- (B) automatically, on the billing application, auditing, the plurality of sets of billing data to create a plurality of sets of audited billing data;
- (C) automatically, reconciling, on the billing application, the plurality of sets of audited billing data to create a plurality of sets of reconciled billing data;
- (D) automatically, storing, the plurality of audited and reconciled sets of billing data, in a database associated with the billing application on the first server network device;
- (E) automatically, securely, returning, the plurality of sets of reconciled billing data from the billing application to the plurality of server network devices via the communications network in real-time, wherein the reconciled plurality of sets of billing data are used to detect and prevent fraudulent use of subscription services on the communications network, wherein fraudulent use of the subscription service includes an attempt to initiate a subscription service that a target mobile network device is not authorized to use or has not paid a required fee to use;
- (F) automatically, detecting, fraud, in real-time, on the billing application using the plurality of sets of reconciled billing records, as any attempted fraudulent initiation of any of the subscription services is being requested by any of the plurality of mobile target network devices on the communications network and before the initiation of any of the subscription services is actually completed on the communications network by comparing in real-time on the billing application on the first server network device selected ones of the reconciled billing records for a mobile target network device to a current call record for the mobile target network device and determining whether any inconsistencies exist between selected ones of the reconciled billing records and the current call record as the mobile target network device is attempting to initiate a subscription service on the communications network;
- (G) automatically, in real-time, on the billing application, completing an additional reconciliation of the selected ones of the reconciled billing records for the mobile target network device based on the determined inconsistencies between the selected ones of the reconciled billing records and the current call record, thereby creating a set of additional reconciled billing records wherein the set of additional reconciliation billing records includes reconciliation of billing records obtained from a plurality of network elements in one or more other different countries and stored in a centralized database associated with the first server network device;
- (H) automatically, comparing, in real-time, on the billing application, on the first server network device the additional set of reconciled billing records to the current call record for the mobile target network device and determining whether any additional inconsistencies exist;
- (J) automatically, preventing any attempted fraudulent initiation of any of the subscription services in real-time on the billing application by refusing initiation of any of the subscription services for the mobile target network device on the communications network;
- (K) automatically, examining in real-time on the billing application the sets of newly developed, audited, reconciled and stored billing records with records stored in the centralized database associated with the first server network device for inconsistencies;
- (L) automatically, re-reconciling, in real-time, on the billing application, any inconsistent examined data in the set of additional reconciled billing records to correct inconsistencies and create a re-examined set of reconciled billing records; and
- (M) automatically, returning, in real-time, the re-examined set of reconciled billing records to appropriate server network devices in the plurality of other server network devices via the communications network,
- (N) wherein the re-examined set of reconciled billing records are also used to detect and prevent fraudulent initiation of any subscription services by any target mobile network devices on the communications network in real-time as any mobile target network device is attempting to initiate a subscription service on the communications network and before the initiation of any of the subscription services is actually completed on the communications network.

17. A system for collecting, auditing, reconciling and billing on a communications network, comprising in combination:
- (A) for automatic, secure, collection, via a communications network, of a plurality of first sets of billing data on a billing application with plural software modules included in a first server network device with one or more processors from a plurality of other server network devices,
  wherein the first server network device and the plurality of other server network devices each have one or more processors,
  wherein the plurality of first sets of billing data are each collected in real-time for a plurality of mobile target network devices for use of subscription services on the communications network,
  wherein a time period for a real-time event completed on the billing application is equivalent to an amount of time required to successfully initiate and connect an individual mobile target network device to a subscription service on the communications network and wherein the subscription services include voice, video or data subscription services;
- (B) for automatic, on the billing application, audit of the plurality of sets of billing data to create a plurality of sets of audited billing data;

(C) for automatic, reconciliation, on the billing application, the plurality of sets of audited billing data to create a plurality of sets of reconciled billing data;

(D) for automatic, storage, of the plurality of audited and reconciled sets of billing data, in a database associated with the billing application on the first server network device;

(E) for automatic, secure, return of the plurality of sets of reconciled billing data from the billing application to the plurality of server network devices via the communications network in real-time, wherein the reconciled plurality of sets of billing data are used to detect and prevent fraudulent use of subscription services on the communications network, wherein fraudulent use of the subscription service includes an attempt to initiate a subscription service that a target mobile network device is not authorized to use or has not paid a required fee to use;

(F) for automatic detection, of fraud, in real-time, on the billing application using the plurality of sets of reconciled billing records, as any attempted fraudulent initiation of any of the subscription services is being requested by any of the plurality of mobile target network devices on the communications network and before the initiation of any of the subscription services is actually completed on the communications network by comparing in real-time on the billing application on the first server network device selected ones of the reconciled billing records for a mobile target network device to a current call record for the mobile target network device and determining whether any inconsistencies exist between selected ones of the reconciled billing records and the current call record as the mobile target network device is attempting to initiate a subscription service on the communications network;

(G) for automatic, completion in real-time, on the billing application, of an additional reconciliation of the selected ones of the reconciled billing records for the mobile target network device based on the determined inconsistencies between the selected ones of the reconciled billing records and the current call record, thereby creating a set of additional reconciled billing records wherein the set of additional reconciliation billing records includes reconciliation of billing records obtained from a plurality of network elements in one or more other different countries and stored in a centralized database associated with the first server network device;

(H) for automatic, comparison, in real-time, on the billing application, on the first server network device the additional set of reconciled billing records to the current call record for the mobile target network device and determining whether any additional inconsistencies exist;

(J) for automatic, prevention, of any attempted fraudulent initiation of any of the subscription services in real-time on the billing application by refusing initiation of any of the subscription services for the mobile target network device on the communications network;

(K) for automatic, examination in real-time on the billing application the sets of newly developed, audited, reconciled and stored billing records with records stored in the centralized database associated with the first server network device for inconsistencies;

(L) for automatic, re-reconciliation, in real-time, on the billing application, any inconsistent examined data in the set of additional reconciled billing records to correct inconsistencies and create a re-examined set of reconciled billing records; and (M) for automatic, return, in real-time, the re-examined set of reconciled billing records to appropriate server network devices in the plurality of other server network devices via the communications network, (N) wherein the re-examined set of reconciled billing records are also used to detect and prevent fraudulent initiation of any subscription services by any target mobile network devices on the communications network in real-time as any mobile target network device is attempting to initiate a subscription service on the communications network and before the initiation of any of the subscription services is actually completed on the communications network.

* * * * *